United States Patent [19]

Mackay et al.

[11] 4,145,603
[45] Mar. 20, 1979

[54] FOOD SERVING SYSTEM

[75] Inventors: Frederick G. Mackay, Tarzana, Calif.; Horace T. Keryluk; Thomas G. Cannon, both of Ft. Collins, Colo.

[73] Assignee: Teledyne Industries, Inc., Ft. Collins, Colo.

[21] Appl. No.: 795,175

[22] Filed: May 9, 1977

[51] Int. Cl.² .............................................. H05B 3/68
[52] U.S. Cl. ................................... 219/387; 219/432; 219/433; 219/449; 219/454; 219/465; 219/473
[58] Field of Search ............... 219/386, 387, 465, 472, 219/473, 521, 449, 432, 433, 454, 415, 416, 218; 126/33; 220/823.2, 23.4, 23.6; 108/25, 26; 211/126, 71

[56] References Cited

U.S. PATENT DOCUMENTS

| Re. 16,908 | 3/1928 | Rittman et al. | 219/433 |
|---|---|---|---|
| 2,024,259 | 12/1935 | Troeber et al. | 126/33 |
| 2,187,196 | 1/1940 | Douglass | 219/387 |
| 2,271,156 | 1/1942 | Walker | 220/8 |
| 2,563,875 | 8/1951 | Salton | 219/465 |
| 2,867,712 | 1/1959 | Schwaneke | 219/454 |
| 3,147,369 | 9/1964 | Salton | 219/449 |
| 3,381,115 | 4/1968 | Welch | 219/387 |
| 3,385,952 | 5/1968 | Mix | 219/387 |
| 3,391,271 | 7/1968 | Campbell | 219/432 |
| 3,636,299 | 1/1972 | Stewart, Jr. | 219/218 |

FOREIGN PATENT DOCUMENTS

| 631408 | 5/1936 | Fed. Rep. of Germany | 219/433 |
|---|---|---|---|
| 735719 | 11/1932 | France | 219/218 |
| 1025595 | 4/1966 | United Kingdom | 219/432 |

Primary Examiner—J. V. Truhe
Assistant Examiner—Bernard Roskoski
Attorney, Agent, or Firm—Hugh H. Drake

[57] ABSTRACT

A warming unit and serving tray combination includes a unit that has a generally planar bottom surface which accommodates resting on a counter top with a top surface being parallel to and spaced above that counter top. The top surface is warmed, and it includes a peripheral margin of a contour that extends therearound. A serving tray has an upper surface corresponding in extent to the top surface of the warming unit and its skirt has a bottom margin matable with the warming unit so as to nest therewith. There are a plurality of openings in the serving tray that receive corresponding food containers seatable therein.

10 Claims, 22 Drawing Figures

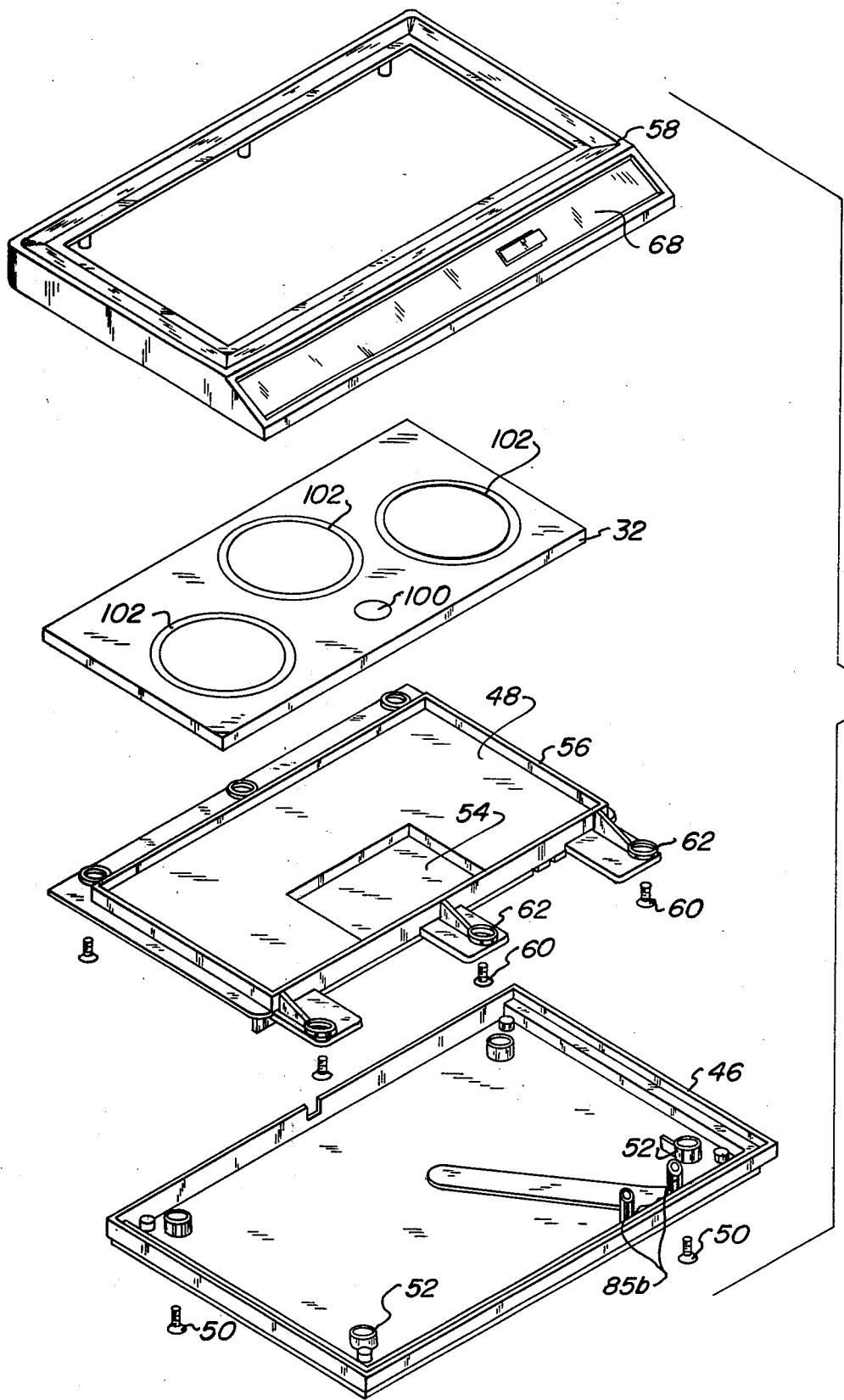

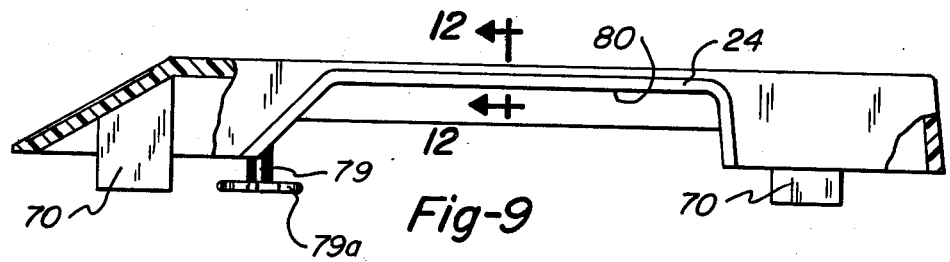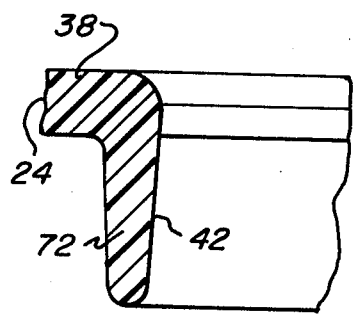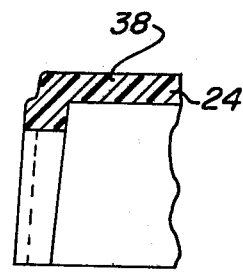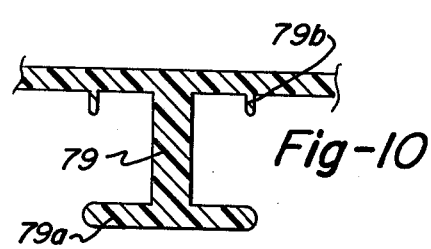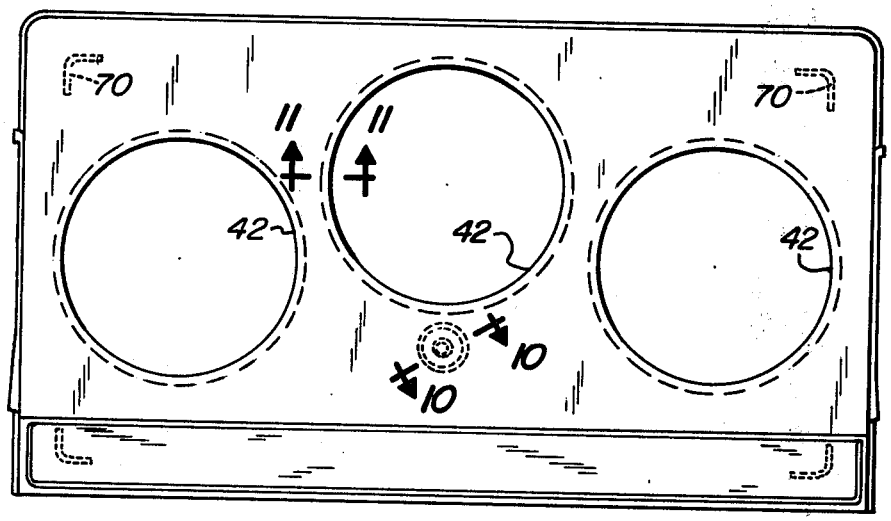

FOOD SERVING SYSTEM

The present invention pertains to a food serving system. More particularly, it relates to a combination of a warming unit and a serving tray which are so combined as to enable the user to accomplish a desired system of feeding.

In the field of feeding those not capable of taking care of themselves, such as infants, and yet achieving performance of that task in an individual environment such as the home, it often is desirable or necessary to provide apparatus which will warm food, or keep previously-heated food warm, for service to the ultimate user. It is known to use a type of warming unit that keeps food at an acceptable temperature and permits serving the food from containers. At least usually, this has involved the use of an ordinary cooking unit together with some kind of serving tray to which food suitably warmed on the cooking unit is transferred for delivery. So far as is known, there has been no direct coordination between the warming function and the serving function of the apparatus. That has led to a deficiency in utilization and, most importantly, it has led to a mechanical design of units which require entirely separate storage when not in use.

In view of the foregoing, it is a general object of the present invention to provide a new and improved warming unit assembly that overcomes basic inefficiency in that which has been described above.

A more specific object of the present invention is to provide a new and improved warming unit and serving tray combination that enables usage in a manner which is more convenient.

In accordance with the present invention, a warming unit and serving tray combination includes a warming unit that has a generally planar bottom surface which accommodates resting of the unit on a counter top. A top surface of the unit is disposed parallel to and spaced above the bottom surface, there are means for warming the top surface, and included are means for defining a peripheral margin of predetermined vertical cross-sectional contour and extending around the periphery of the top surface. The serving tray has a generally planar upper surface corresponding in extent to the top surface of the warming unit and having a peripheral and downwardly depending skirt the bottom margin of which has a contour matable with the predetermined contour as to accept nesting of the serving tray on the warming unit. Defined in the upper surface of the serving tray are means that establish a plurality of openings, and a plurality of food containers individually are seatable in respective different ones of the openings.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 7 is an exploded perspective view of the food warmer as shown in FIG. 3;

FIG. 8 is a top plan view of the serving tray shown in FIG. 1;

FIG. 9 is an end elevational view, partially broken away with a vacuum cup removed, of the tray shown in FIG. 8;

FIG. 10 is a fragmentary cross-sectional view taken along the line 10—10 in FIG. 8;

FIG. 11 is a fragmentary cross-sectional view taken along the line 11—11 in FIG. 8;

FIG. 12 is a fragmentary cross-sectional view taken along line 12—12 in FIG. 9;

FIG. 18 is a fragmentary cross-sectional view of that container as taken along line 18—18 in FIG. 16a;

FIG. 19 is a fragmentary side elevational view of a portion of the container shown in FIG. 16a.

Figure 1:
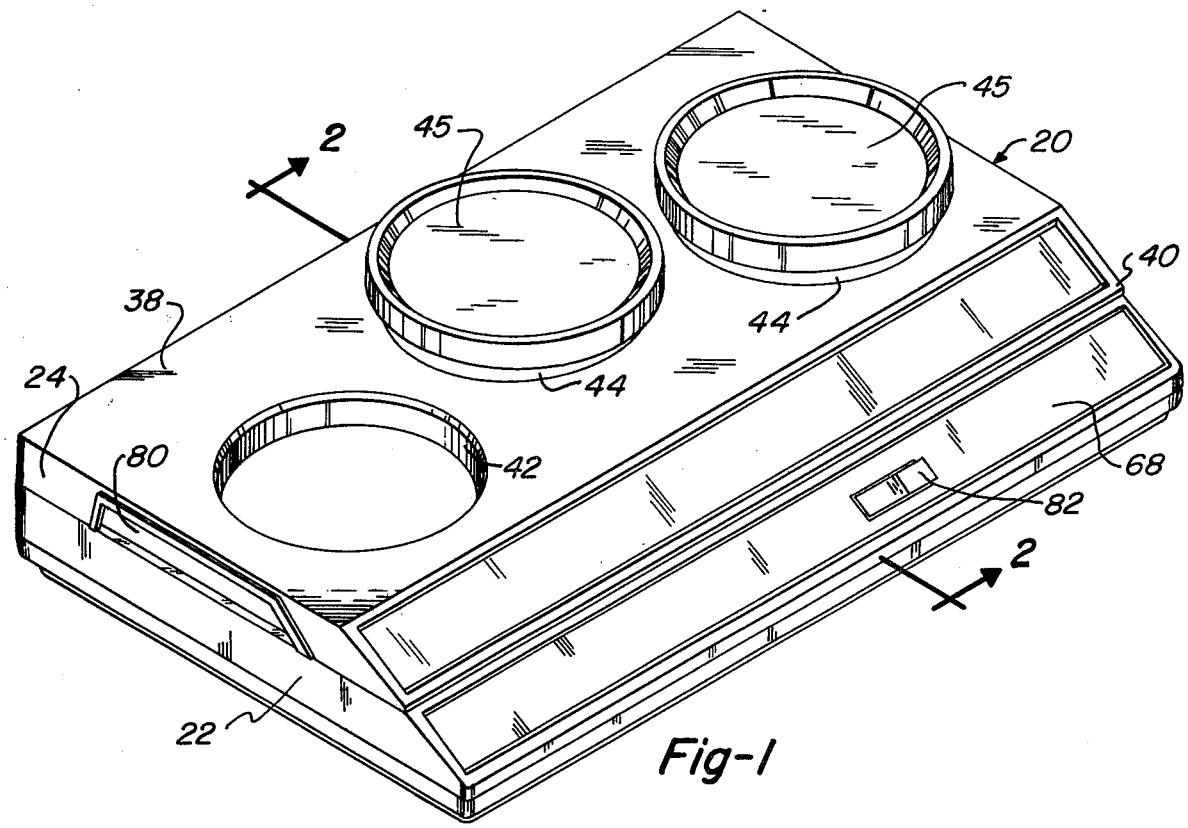
FIG. 1 is an embodiment of one form of food warmer with a serving tray emplaced thereon.
Figure 2:
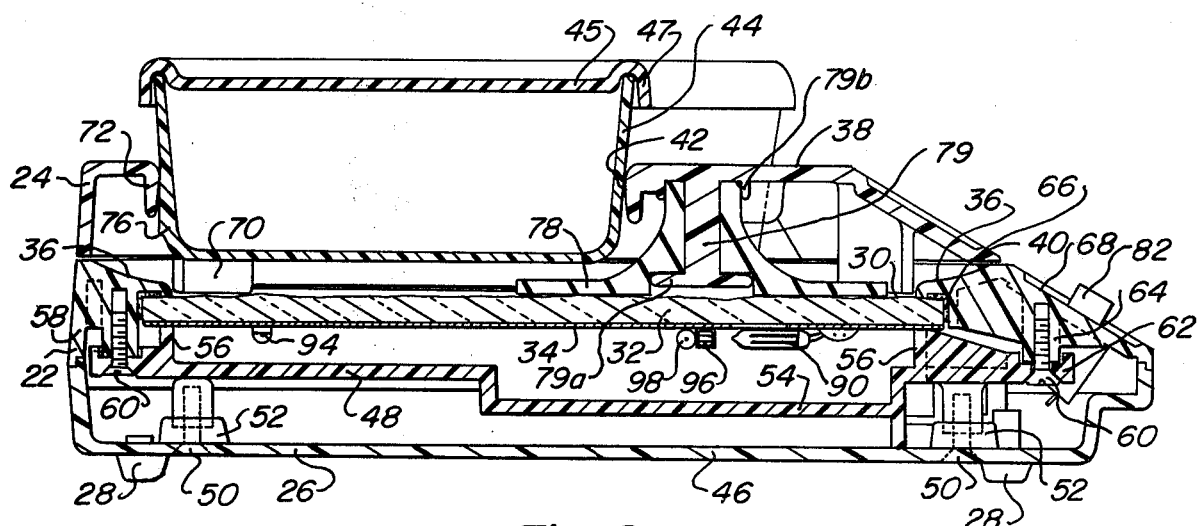
FIG. 2 is a cross-sectional view taken along the line 2—2 in FIG. 1.
Figure 3:
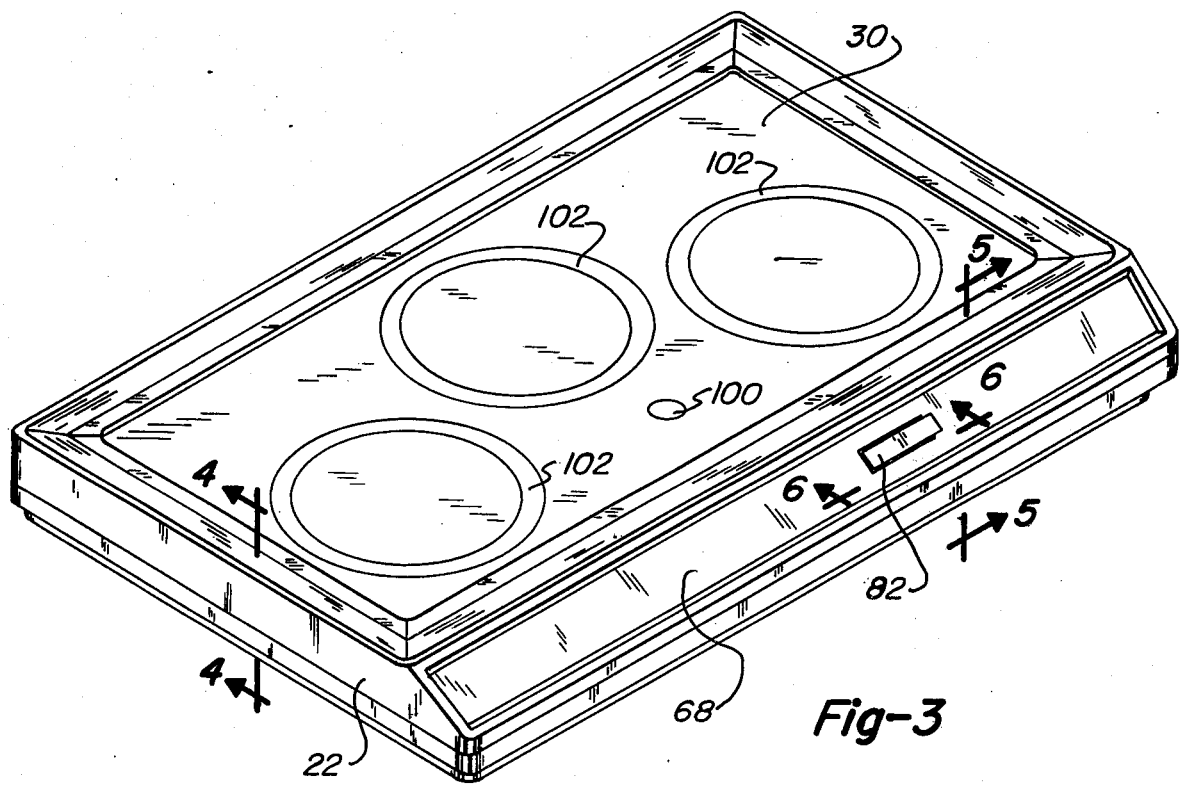
FIG. 3 is a perspective view of the food warming portion of FIG. 1 with the serving tray removed.
Figure 4:
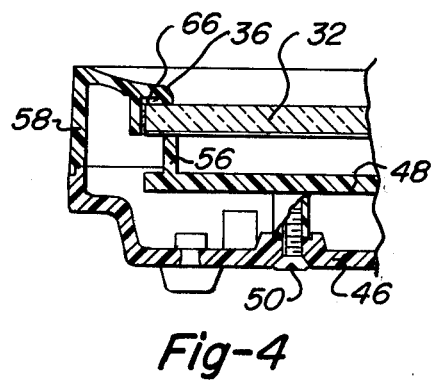
FIG. 4 is a fragmentary cross-sectional view taken along the line 4—4 in FIG. 3.
Figure 5:
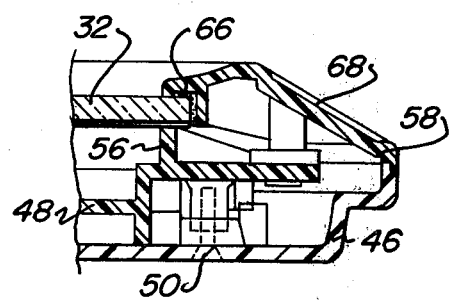
FIG. 5 is a fragmentary cross-sectional view taken along the line 5—5 in FIG. 3.
Figure 6:
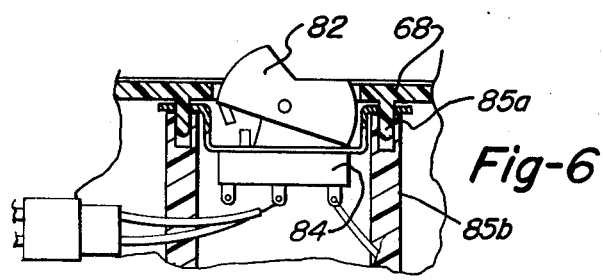
FIG. 6 is a fragmentary cross-sectional view taken along the line 6—6 in FIG. 3.
Figure 13:
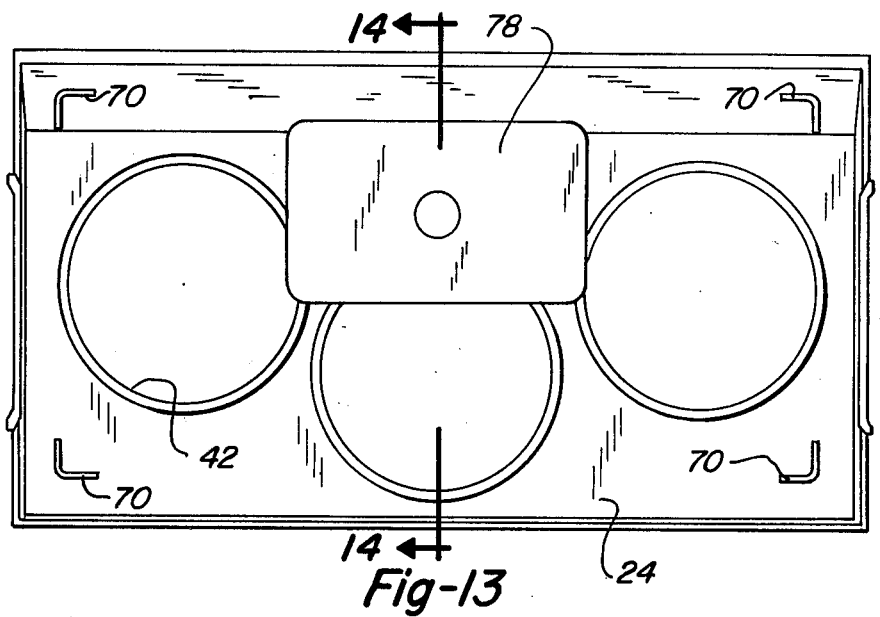
FIG. 13 is a bottom plan view of the serving tray shown in FIG. 8.
Figure 14:
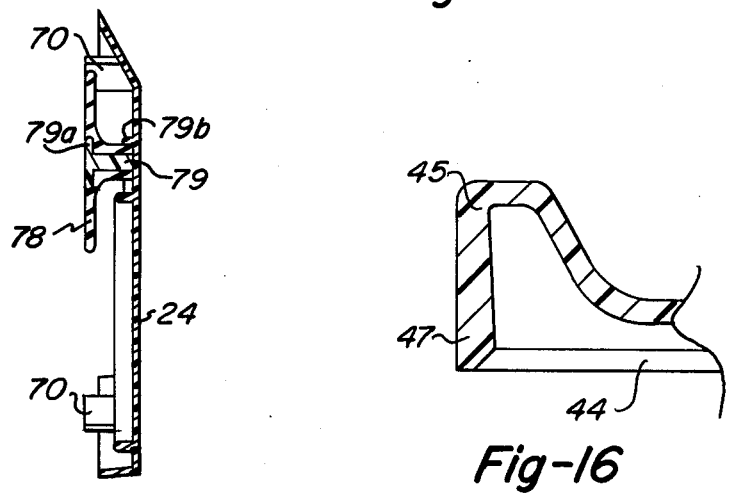
FIG. 14 is a fragmentary cross-sectional view taken along the line 14—14 in FIG. 13.
Figure 16:
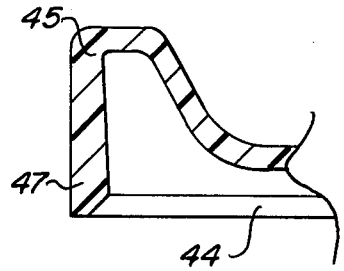
FIG. 16 is a cross-sectional view taken along the line 16—16 in FIG. 15.
Figure 15:
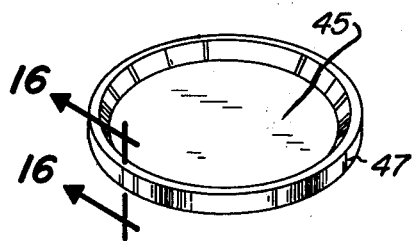
FIG. 15 is a perspective view of a lid for a container shown in FIG. 1.

A warming unit and serving tray combination 20 includes both a warming unit 22 and a non-metallic serving tray 24. The warming unit has a generally planar bottom surface 26 provided with suitable resilient feet 28 so as to accommodate resting of the unit on a counter top or the like. A top surface 30 is spaced above and oriented parallel to bottom surface 26. Top surface 30 is the upper surface of a sheet 32 preferably composed of glass but which also may be any suitable ceramic. On the underside of sheet 32 is a resistive heating element 34 which serves to warm top surface 30. Captivating and surrounding sheet 32 is a peripheral margin 36 of a selected vertical cross-sectional contour. Margin 36 extends around the periphery of top surface 30. Serving tray 24 has a generally planar upper surface 38 of a size to correspond in extent to top surface 30; in more detail, a peripheral skirt 40 of tray 24 so depends downwardly as to have a bottom margin of a contour to be matable with the contour of the peripheral margin 36 of the warming unit and thereby to permit nesting of tray 24 on warming unit 22. A plurality of openings 42 are defined in upper surface 38 of tray 24. A like plurality of food containers 44 individually are seatable in respective different ones of openings 42.

As herein embodied for the purpose of permitting advantageous assembly, warming unit 22 is formed of a base 46 on top of which a support plate 48 is secured by means of screws 50 which extend through appropriately spaced mating bosses 52. A well 54 defined in plate 48 accommodates certain electrical components yet to be described.

Upstanding from plate 48 is a rib 56 upon which sheet 32 is disposed when the unit is assembled. A retainer 58 is mounted atop support plate 48 by means of screws 60 which individually extend through respective different peripherally spaced mating bosses 62 and 64. Margin 36 is defined in retainer 58 and extends inwardly over the outer edge portion of sheet 32 so as to secure the latter in place on top of rib 56. A sealant 66 is placed just inside the inner lip of margin 36 and on top of that periphery of sheet 32 so as to prevent liquids from draining into the space below.

At the front of the unit, skirt 40 slants downwardly and outwardly in correspondance with a similar panel 68 formed on the front wall of retainer 58. At the rear of the unit, skirt 40 is formed with a more vertical orientation so as to seat neatly atop the upper margin of retainer 58. Corner members 70 project downwardly from the underside of tray 24 so as to rest upon surface 30 immediately inside the corresponding four corners of margin 36. Thus, the combination of all of the lower marginal portions of tray 24, including corner members 70, serves to cause tray 24 to be accepted in nesting relationship with regard to unit 22. Each of openings 42 has a peripheral skirt 72 which tapers outwardly from the opening in the downward direction. Containers 44 each have a side wall 74 of a diameter to be received somewhat snugly within any one of openings 42. A plurality of circumferentially-spaced nubs 76 project outwardly from side wall 74 and are spaced and oriented so as cammingly to engage with skirts or margins 42 and snappingly seat containers 44 within openings 42. Each of containers 44 preferably includes stippled bands 77 alternating with plain bands so as to define one ounce levels.

Projecting downwardly from the bottom of tray 24 is a vacuum cup 78 capable of engagement either with top surface 30 or a surface external to the unit such as a counter top or the tray of a high chair. The approach is to enable serving tray 24 to be placed securely in front of the infant with containers 44 within his reach and yet not easily caused to spill their contents. Cup 78 includes a shank portion received on a bobbin 79, over a flange 79a and within a skirt 79b. Opposing recesses 80 are formed into the lateral end portions of the skirt on tray 24 so as to serve as handholds for removal of tray 24 from on top of warming unit 22 and also to assist in placement of the serving tray on another surface, such as on the tray of the high chair of the infant to be fed. Each container 44 includes a top 45 so formed, in a now well known manner, as to have an outer skirt 47 which is cammingly receivable over the upper rim of the container.

Figure 21:
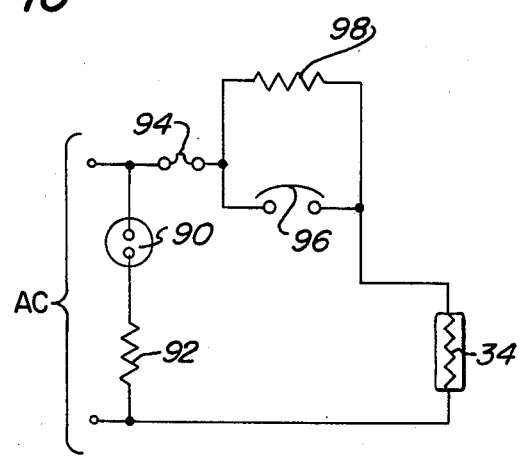
FIG. 21 is a diagram of the control circuitry incorporated in the food warmer.
Figure 20:
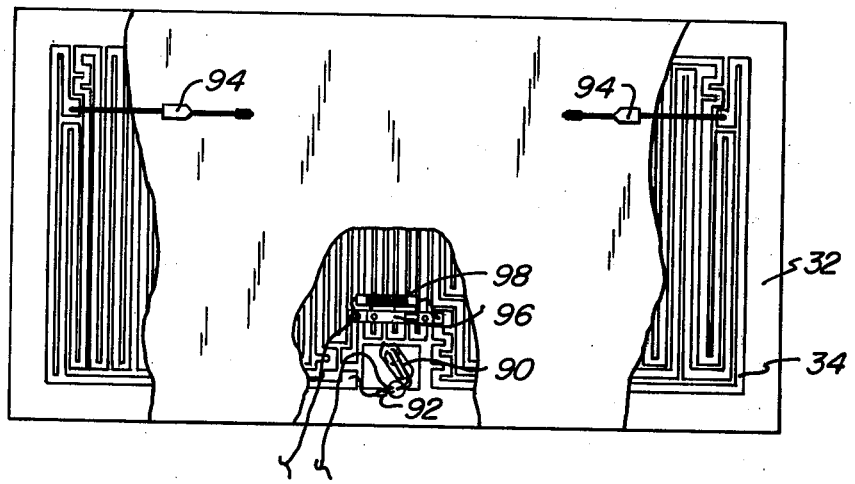
FIG. 20 is a fragmentary bottom plan view of a portion of a component shown in FIG. 7.
Figure 16A:
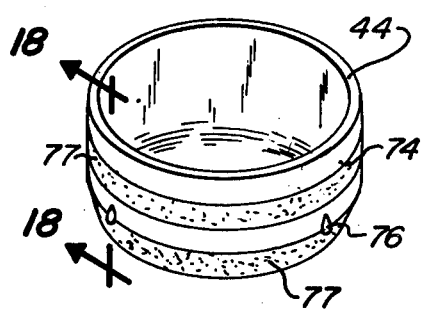
FIG. 16a is a perspective view of that container without the lid.
Figure 17:
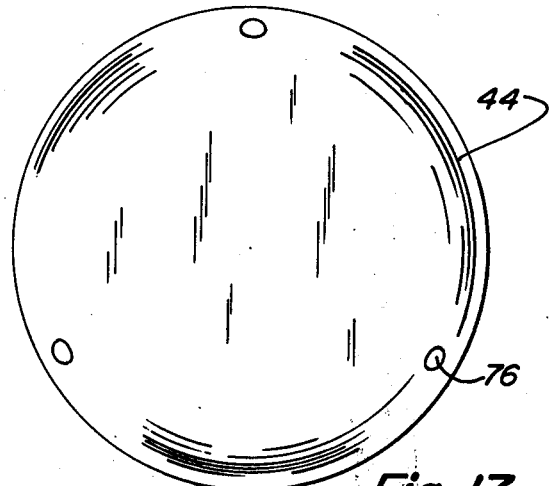
FIG. 17 is a bottom plan view of that container.
Figure 18:
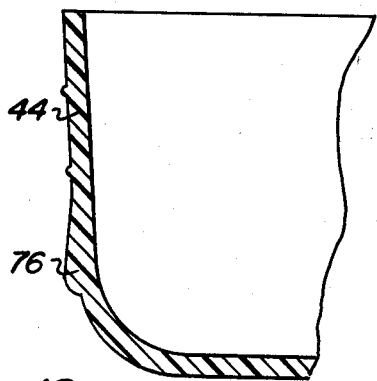
Figure 19:
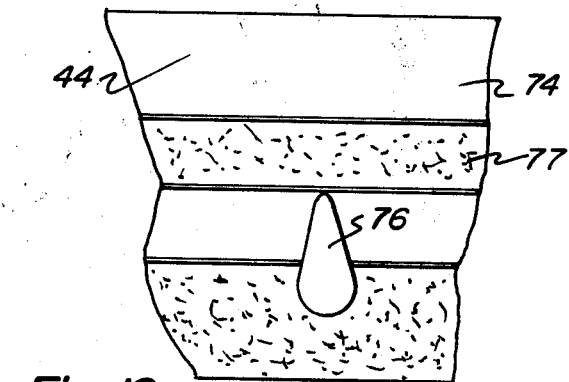

Projecting outwardly from front panel 68 is a switch operator 82 so arranged as to selectively activate or deactivate a switch 84 which supplies power to warming element 34. Switch 84 is captivated on pegs 85a which, upon overall assembly, are received within bosses 85b that upstand from base 46. Element 34 is a resistance heating element which meanders across the lower face of sheet 32 as shown in FIG. 20. The externally available power supplied to element 34 is fed through the circuitry shown in FIG. 21. The input labeled "AC" is that supplied through switch 84. Connected across the incoming line terminals is a pilot light 90 in series with a current limiting resister 92. One side of the incoming line extends to one end of heating element 34. The other side of the incoming line extends through a protective fusible link 94 and then to the parallel combination of a thermostat 96 and a resistance unit 98. From that side of the input, a common connection extends to the other end of warming element 34. As shown in FIG. 20, a fusible link is included in each side of the supply. Except for element 34 and links 94, all of the electrical components just described are disposed within well 54. Pilot light 90 is secured beneath sheet 32 at a front-central location as indicated at 100 in different ones of figures.

The purpose of resistance 98 is to provide immediately-adjacent heat in order to keep thermostat 96 from again closing too shortly after it opens. That is, the function is to increase the time period between opening and closing of the thermostat. The function of resistance heater 98 may be accomplished by the provision of a suitable heat sink in direct physical association with thermostat 96.

Heater element 34, in itself, preferably is first formed on a flexible substrate, of plastic or the like, that is coated on the other side with a suitable adhesive. During assembly, the entire heating element is then mounted on the underside of sheet 32 as a press-on decal. In manufacture of sheet 32, top surface 30 preferably is printed with indicia 102 that tend to direct the user where to place the ones of containers 44 to be subjected to heat. Indicia 102 especially tend to prevent the user from placing a container to be heated directly above the position of thermostat 96 as indicated by the pilot light indicator 100.

Desirably, upper surface 30 of sheet 32 is of a pebbled texture. Preferably being of tempered glass, sheet 32 tends at times to exhibit what appear to be defects. Although such defects do not affect the performance of the glass, they may be aesthetically unattractive. By pebbling the surface, there is a tendency to "hide" such abberations. In addition, the pebbling of surface 30 serves to reduce the undesired contact of a finger with the heated surface.

In operation, the entire combination is removed from storage and serving tray 24 is set to one side. By means of switch 82, warming unit 22 is put into operation. The circuitry of FIG. 21 preferably is designed so that thermostat 96 permits energization of heating element 34 for a period of about eight minutes. With that approach, it is found that, in about ten to fifteen minutes from the initial energization, foodstuff within containers 44, that previously had been stored in a refrigerator at approximately 40 degrees, will reach a serving temperature of approximately 100 degrees. In the present embodiment, the entire unit must be turned off to permit recycling. However an alternative approach may be used in the circuitry of FIG. 21 so as to enable an averaging of temperature of the foodstuff within containers 44 at a desired level for serving. After the feeding, and the cleaning of the exposed surfaces as well as containers 44, the entire combination is reassembled so as to permit compact storage.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A warming unit and serving tray combination comprising:
   a warming unit having a generally planar bottom surface accommodating resting of said unit on a counter top, a flat and electrically insulative but heat conductive top surface parallel to and spaced above said bottom surface, means affixed to the underside of said top surface for warming said top surface, and means, including means for securing said top surface in position with respect to said bottom surface, for defining a peripheral margin of uniform predetermined vertical cross-sectional contour and extending around the entire periphery of said top surface;
   a non-metallic serving tray having a generally planar upper surface corresponding in extent to said top surface of said warming unit and having a peripheral and downwardly depending skirt means the bottom margin of which has a contour matable with the outer edge portion of said predetermined contour on all sides of said periphery and means matable with respect to said peripheral margin for nesting said serving tray directly on said top surface of said warming unit;
   means defining a plurality of openings in said upper surface of said serving tray;
   and a plurality of food containers individually seatable in respective different ones of said openings.

2. A combination as defined in claim 1 in which each of said containers includes a sidewall receivable within a corresponding one of said openings, and in which a plurality of circumferentially-spaced nubs project outwardly from said sidewall for camming engagement with the respective margins of said openings to seat snappingly said containers within said openings.

3. A combination as defined in claim 1 in which said top surface includes a resistance heating element meandering across its lower face, and in which the upper face of said top surface is provided with indicia representing placement of said containers directly on said top surface in an array corresponding with the distribution of said openings.

4. A combination as defined in claim 1 in which a vacuum cup projects downwardly from said serving tray for engagement with either said top surface or a surface external to said combination.

5. A combination as defined in claim 1 which further includes means for regulating the temperature of said top surface and limiting the maximum temperature.

6. A combination as defined in claim 1 in which said skirt includes opposing recesses to serve as handholds for removal of said tray from said unit.

7. A combination as defined in claim 1 in which said top surface includes a resistance heating element therefor and a thermostat located therebeneath, and in which the upper face of said top surface is provided with indicia indicating placement of said containers directly on said top surface in a position away from the location of said thermostat.

8. A combination as defined in claim 1 which includes means for periodically energizing said warming means at a rate maintaining proper serving temperature of foodstuff in said containers.

9. A combination as defined in claim 1 in which said warming unit includes upper and lower portions secured together for captivating said top surface.

10. A combination as defined in claim 1 in which said serving tray includes means for securing said containers in said tray against dislodging effort by a person being fed from said tray.

* * * * *